US012443901B2

(12) United States Patent
Woltcheck

(10) Patent No.: US 12,443,901 B2
(45) Date of Patent: Oct. 14, 2025

(54) AUTOMATED ALLOCATION OF SHARED RESOURCES IN TRANSPORTATION NETWORKS

(71) Applicant: IntrNodal, Inc., Chicago, IL (US)

(72) Inventor: Michael Woltcheck, Chicago, IL (US)

( * ) Notice: Subject to any disclaimer, the term of this patent is extended or adjusted under 35 U.S.C. 154(b) by 247 days.

(21) Appl. No.: 17/670,241

(22) Filed: Feb. 11, 2022

(65) Prior Publication Data
US 2022/0261720 A1 Aug. 18, 2022

Related U.S. Application Data

(60) Provisional application No. 63/148,759, filed on Feb. 12, 2021.

(51) Int. Cl.
*G06Q 10/0631* (2023.01)
*G06Q 10/0833* (2023.01)
*G06Q 50/40* (2024.01)

(52) U.S. Cl.
CPC ... *G06Q 10/06312* (2013.01); *G06Q 10/0833* (2013.01); *G06Q 50/40* (2024.01)

(58) Field of Classification Search
CPC .............. G06Q 10/0833; G06Q 50/30; G06Q 10/06312
See application file for complete search history.

(56) References Cited

U.S. PATENT DOCUMENTS

| 11,107,029 B1* | 8/2021 | Henry | H04L 47/783 |
| 2004/0193466 A1* | 9/2004 | Kull | G06Q 10/08 705/28 |
| 2006/0195348 A1* | 8/2006 | Peterkofsky | G06Q 10/087 705/7.12 |
| 2011/0133888 A1* | 6/2011 | Stevens | G06Q 10/0833 340/8.1 |

(Continued)

OTHER PUBLICATIONS

A. Chauhan, G. Savner, P. Venkatesh, V. Patil and W. Wu, "A Blockchain-Based Tracking System," 2020 IEEE International Conference on Service Oriented Systems Engineering (SOSE), Oxford, UK, 2020, pp. 111-115, doi: 10.1109/SOSE49046.2020.00020. https://ieeexplore.ieee.org/abstract/document/9183541 (Year: 2020).*

*Primary Examiner* — Rupangini Singh
*Assistant Examiner* — Stephanie S. Wallick
(74) *Attorney, Agent, or Firm* — Miller IP Law; Devin Miller

(57) ABSTRACT

Systems and methods for automated allocation of shared resources in transportation networks are described herein. A facility computing device can be configured to store data corresponding to a location of a transportation facility. A vehicle computing device can be associated with a vehicle and configured to provide navigation directions for the vehicle. A yard database can store information corresponding to a location of a yard for staging trailers. A trailer computing device can be associated with a trailer and configured to track a location of the trailer. The system can include at least two endpoint computing devices. The system (Continued)

can include a yard management computing device communicatively coupled with the facility computing device, the vehicle computing device, the yard database, the trailer computing device, and the at least two endpoint computing devices.

14 Claims, 8 Drawing Sheets

(56) References Cited

U.S. PATENT DOCUMENTS

| | | | | |
|---|---|---|---|---|
| 2015/0045064 | A1* | 2/2015 | Junkar | H04W 64/00 |
| | | | | 455/456.3 |
| 2015/0066561 | A1* | 3/2015 | Wills | G06Q 10/06314 |
| | | | | 705/7.23 |
| 2015/0324736 | A1* | 11/2015 | Sheets | G06Q 10/08 |
| | | | | 705/330 |
| 2016/0019497 | A1* | 1/2016 | Carvajal | G01C 21/34 |
| | | | | 705/333 |
| 2016/0301698 | A1* | 10/2016 | Katara | H04L 63/102 |
| 2017/0091708 | A1* | 3/2017 | Rao | G06Q 10/0833 |
| 2017/0372261 | A1* | 12/2017 | Bhatia | G06K 19/06 |
| 2019/0043010 | A1* | 2/2019 | Smith | G06Q 10/0833 |
| 2019/0064835 | A1* | 2/2019 | Hoofard | G05D 1/228 |
| 2019/0066033 | A1* | 2/2019 | Mains, Jr. | G06Q 10/083 |
| 2019/0095859 | A1* | 3/2019 | Pike | G06Q 10/0834 |
| 2020/0055553 | A1* | 2/2020 | Raasch | G01S 15/08 |
| 2020/0382925 | A1* | 12/2020 | Doig | G01S 19/51 |
| 2022/0051182 | A1* | 2/2022 | Fox | G08B 25/008 |
| 2022/0198036 | A1* | 6/2022 | Bayat | G06Q 20/385 |

* cited by examiner

AUTOMATED ALLOCATION OF SHARED RESOURCES IN TRANSPORTATION NETWORKS

CROSS-REFERENCE TO RELATED APPLICATION

The present application claims the benefit of U.S. Provisional Application No. 63/148,759, entitled "AN AUTONOMOUS UNIVERSAL ON DEMAND YARD MANAGEMENT SYSTEM," filed on Feb. 12, 2021. The entire contents of the above-listed application are hereby incorporated by reference for all purposes.

BACKGROUND

Physical items can be shipped between entities in different locations using a transportation network. Entities involved in the transportation of such items can include shippers, receivers, and third-party entities that provide vehicles, trailers, storage, or other resources used to transport the items from the shippers to the receivers. It can be difficult to communicate information between these entities in a manner that allows for efficient use of resources for shipping the physical items.

BRIEF DESCRIPTION OF THE DRAWINGS

The present description will be understood more fully when viewed in conjunction with the accompanying drawings of various examples of systems and methods for automated allocation of shared resources in transportation networks. The description is not meant to limit the systems and methods to the specific examples. Rather, the specific examples depicted and described are provided for explanation and understanding of systems and methods for automated allocation of shared resources in transportation networks. Throughout the description, the drawings may be referred to as drawings, figures, and/or FIGs.

DETAILED DESCRIPTION

Figure 1:
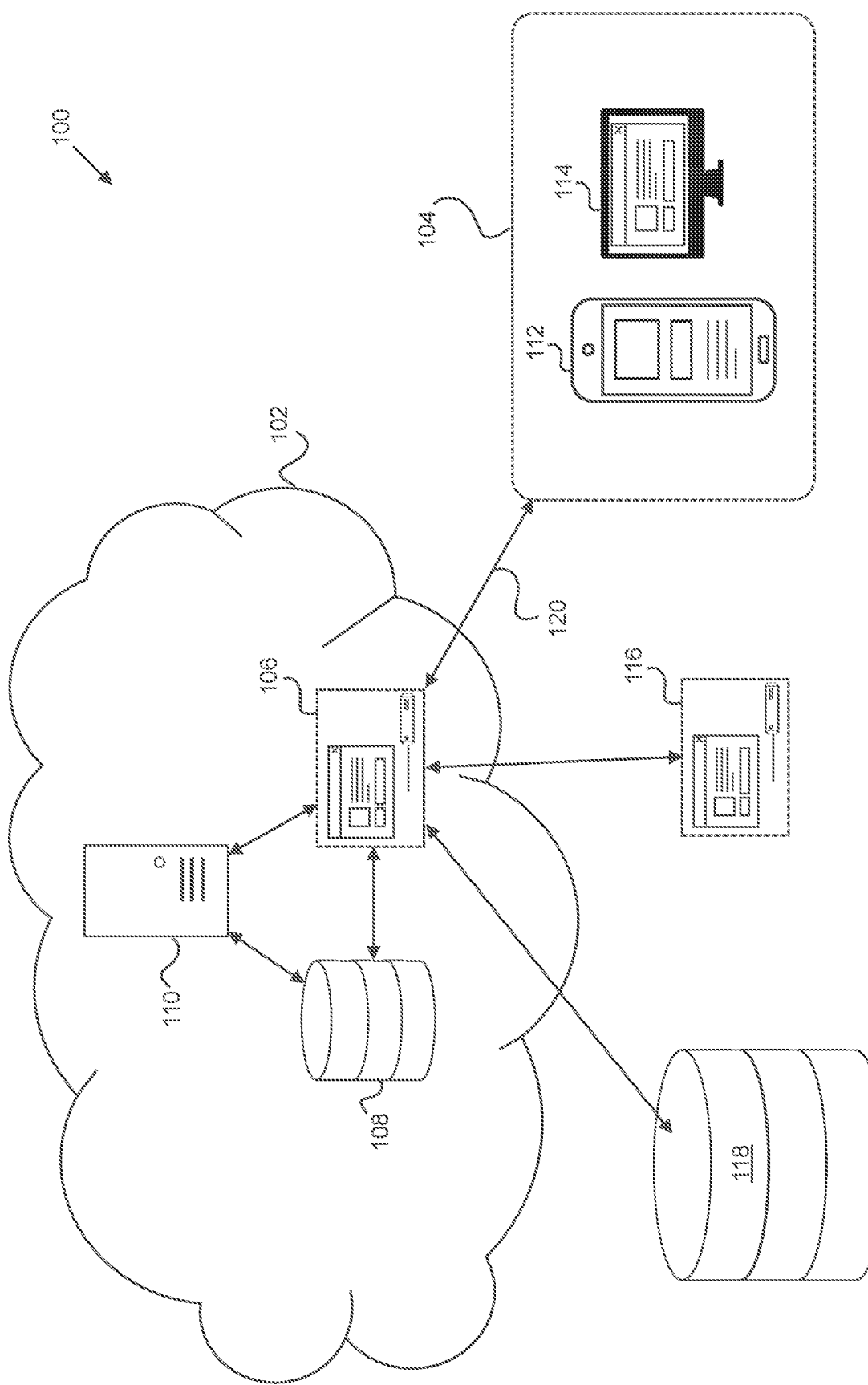
FIG. 1 illustrates a project management system, according to an embodiment.

Automated allocation of shared resources in transportation networks as disclosed herein will become better understood through a review of the following detailed description in conjunction with the figures. The detailed description and figures provide merely examples of the various embodiments of automated allocation of shared resources in transportation networks. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional techniques for moving items via a transportation network can include loading the items into trailers and using vehicles to move the trailers between facilities. A facility may have one or more docks and each dock can be occupied by a trailer so that the trailer can be loaded or unloaded. Yards may also be provided for storage of unused trailers. Some entities, such as business organizations or government entities, may ship and receive a large number of items to and from various other entities. Each shipment can require several discrete operations that must be performed in series, including loading the item to be shipped onto a trailer, driving the trailer to the destination facility, and unloading the item from the trailer at the destination facility. As a result, the logistics for efficiently shipping and receiving goods using transportation networks can be complex.

Current techniques for allocating resources in transportation networks suffer from several drawbacks. The number of items shipped and the origins and destinations of shipments can change over time. Thus, the demand for resources within a transportation network may vary substantially at different times and locations across the transportation network. To ensure that necessary resources such as trailers, vehicles, and drivers are available even at times of peak demand throughout a transportation network, a shipper may have to maintain a large number of such resources. However, this can have significant financial costs and can lead to inefficient use of resources during times of lower demand. For example, an efficient model for transporting a shipment can include little or no wait time for the driver at both the origin and the destination. A shipment in which a trailer is loaded and ready as soon as the driver arrives at the origin facility and is unloaded as soon as the driver arrives at the destination facility (i.e., zero wait time for the driver) can be referred to in this disclosure as a drop-drop load. Maintaining sufficient resources to ensure drop-drop loads for all shipments can be prohibitively expensive for many organizations.

Some services provide resource sharing for transportation networks, such as universal trailer pools (UTPs). A UTP can be or can include an entity that provides a set of trailers for use by other entities (i.e., shippers or receivers). The trailers can be shared among the other entities, for example, as allocated by the UTP[1]$_{[DM2]}$.[3]$_{[DM4]}$ To meet peak demand, a UTP may require many trailers to service a given freight volume. Conventionally, UTPs may operate using a ratio of trailers to loads of between 3:1 and 5:1. Trailers that are not being used to move freight represent lost revenue for UTPs.

In addition, it can be challenging to share necessary data between the entities used for shipments (e.g., shippers, trailers, vehicles, drivers, receivers, etc.). Typically, sharing data is accomplished with manual processes such as human operators speaking with one another via radio and recording data using pen and paper. The shipper generally controls the process, and therefore also controls the data flow. For example, the shipper may use a radio to communicate information to a worker in a yard regarding access to the yard assets, and the worker may manually write that data onto paper. The shipper may also communicate information to the UTP, for example via an interface provided by the UTP. However, because the shipper controls this process, the UTP and the yard assets generally do not share data with one another. Stated differently, there may be a gap[5]$_{[DM6]}$ between the UTP and the yard assets (e.g., trailers and storage spaces), as those entities do not generally share data during loading operations. This gap in the data flow can make it difficult or impossible to automate the process of transporting items from a shipper to a receiver.

The various implementations of this disclosure address the shortcomings of current resource allocation techniques for transportation networks described above. An automated system can be configured to fill the data flow gap described above, by providing easily accessible and reliable data to all of the entities and/or assets involved in transporting shipments (e.g., UTPs, shippers, receivers, yard assets, etc.). Thus, the systems and methods described in this disclosure can allow an entity with shareable yard management assets, such as trucks, drivers, and storage space, to provide third party UTPs or its own UTP access to all shippers and receivers in an area, even if the shippers or receivers do have their own yard management assets. A yard management entity can source or own yard management assets in an area local to a group of shippers and receivers. The yard management entity can make its assets shareable to the shippers and receivers. The term shareable in this disclosure can indicate that an asset is not owned by a shipper, but is made available for on-demand requests from a shipper in a coverage area where the assets are located. For example, if four shippers in an area share resources, then any of the four shippers within that coverage area could request on-demand access to all of those resources with little resistance. Assets in the transportation network can be coupled with respective computing devices to record and share data in an automated fashion. For example, such computing devices can be or can include proximity sensors, global positioning system (GPS) modules, databases storing map information, and mobile computing devices for use by human operators such as drivers.

In some embodiments, groups of shippers can be formed based on an optimization function and all requested shipments from the shippers in that group can be put into a queue for a local truck to service. The yard management entity can be a UTP or can integrate with a UTP so data can transfer between the yard management assets easily, without any action or input from the shipper. Thus, the UTP can have access to the yard management entity's coverage area to know which shippers and receivers in the area are set up for service. If a shipper or receiver is in the coverage area but not signed up, the yard management entity can contact the shipper or receiver to help them join the group and equip them with any necessary computing devices or software applications.

In some embodiments, the yard management entity can initiate an automated process for handling a shipping request within the network. The yard management entity can have a computing device that is configured to detect a trigger to begin the automated process. In some embodiments, the trigger for the automated process can be when a shipper's load, on the yard management's network, is tendered over to the third party UTP or the yard management entity's internal UTP. In this disclosure, the term "tendered over" can be used to describe that the party who has received the load is now responsible to move the load to its destination. The yard management entity computing device can create and issue an authorization to the shipper. The authorization token can give the shipper the ability to request a trailer via the yard management company. The authorization token can include or be transmitted along with other data uniquely identifying the shipper, the item or items to be shipped, and other relevant shipment data that can be shared between all parties to the shipment. The authorization token can also be used by the yard management entity to bill the UTP as proof of service. Thus, the implementations of this disclosure can automate portions of the shipment process and automatically allocate shareable resources to make efficient use of a transportation network.

FIG. 1 illustrates a project management system 100, according to an embodiment. The project management system 100 includes internal and external data resources for managing a project. The project management system 100 may result in reduced memory allocation at client devices and may conserve memory resources for application servers.

The project management system 100 may include a cloud-based data management system 102 and a user device 104. The cloud-based data management system 102 may include an application server 106, a database 108, and a data server 110. The user device 104 may include one or more devices associated with user profiles of the project management system 100, such as a smartphone 112 and/or a personal computer 114. The project management system 100 may include external resources such as an external application server 116 and/or an external database 118. The various elements of the project management system 100 may communicate via various communication links 120. An external resource may generally be considered a data resource owned and/or operated by an entity other than an entity that utilizes the cloud-based data management system 102 and/or the user device 104.

The project management system 100 may be web-based. The user device 104 may access the cloud-based data management system 102 via an online portal set up and/or managed by the application server 106. The project management system 100 may be implemented using a public Internet. The project management system 100 may be implemented using a private intranet. Elements of the project management system 100, such as the database 108 and/or the data server 110, may be physically housed at a location remote from an entity that owns and/or operates the project management system 100. For example, various elements of the project management system 100 may be physically housed at a public service provider such as a web services provider. Elements of the project management system 100 may be physically housed at a private location, such as at a location occupied by the entity that owns and/or operates the project management system 100.

The communication links 120 may be direct or indirect. A direct link may include a link between two devices where information is communicated from one device to the other without passing through an intermediary. For example, the direct link may include a Bluetooth™ connection, a ZigbeeRconnection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
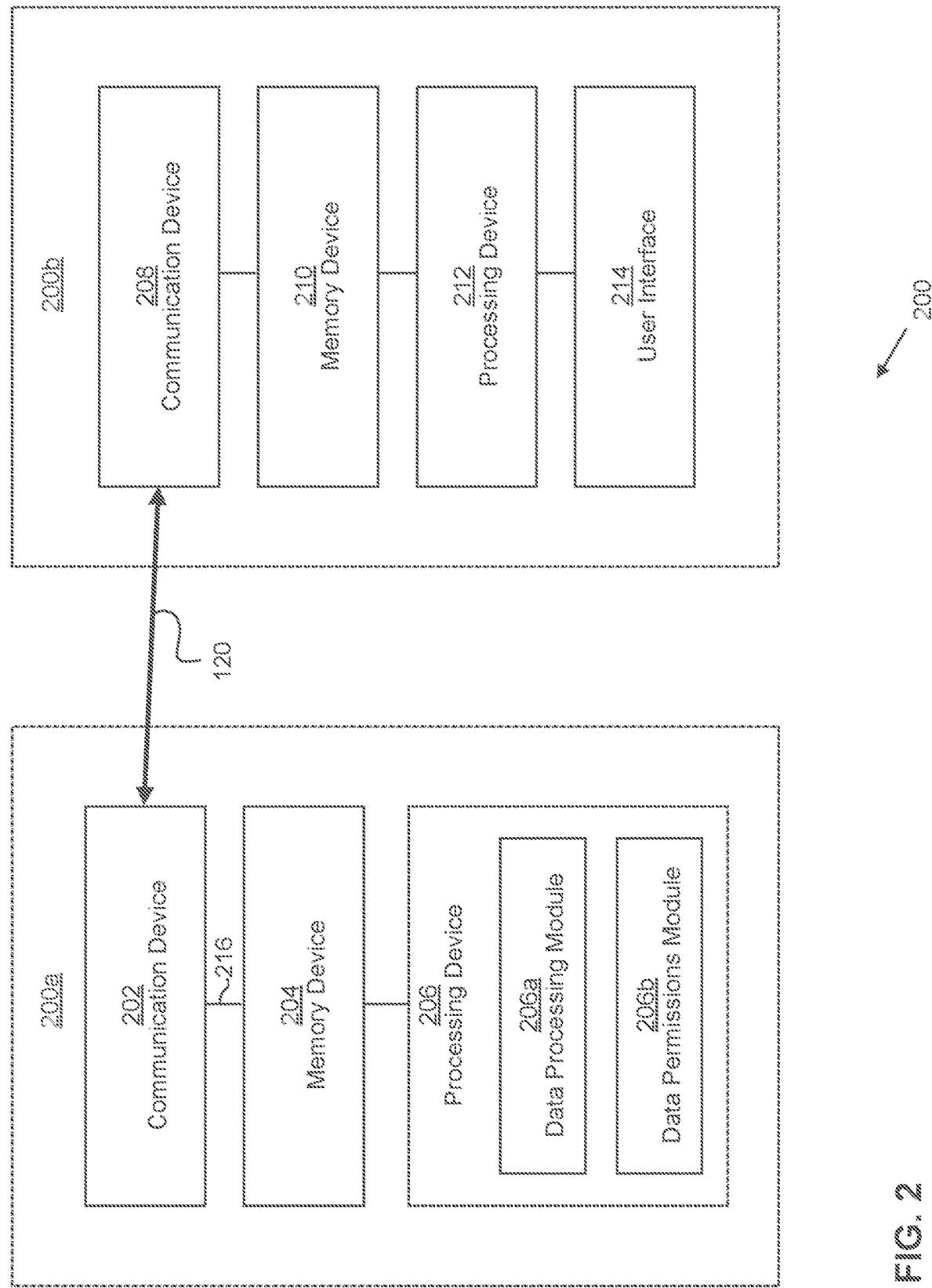
FIG. 2 illustrates a device schematic for various devices used in the project management system of FIG. 1, according to an embodiment.

FIG. 2 illustrates a device schematic 200 for various devices used in the project management system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where "module" refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, an address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g. as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may be representative of various devices of the project management system 100. Various of the elements of the project management system 100 may include data storage and/or processing capabilities. Such capabilities may be rendered by various electronics for processing and/or storing electronic signals. One or more of the devices in the project management system 100 may include a processing device. For example, the cloud-based data management system 102, the user device 104, the smartphone 112, the personal computer 114, the external application server 116, and/or the external database 118 may include a processing device. One or more of the devices in the project management system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the project management system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the project management system 100 may include data communication capabilities. Such capabilities may be rendered by various electronics for transmitting and/or receiving electronic and/or electromagnetic signals. One or more of the devices in the project management system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various of the elements in the project management system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human readable text.

Various of the devices in the project management system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the data analysis system 100 and/or various elements of the data analysis system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the data analysis system 100.

Figure 3:
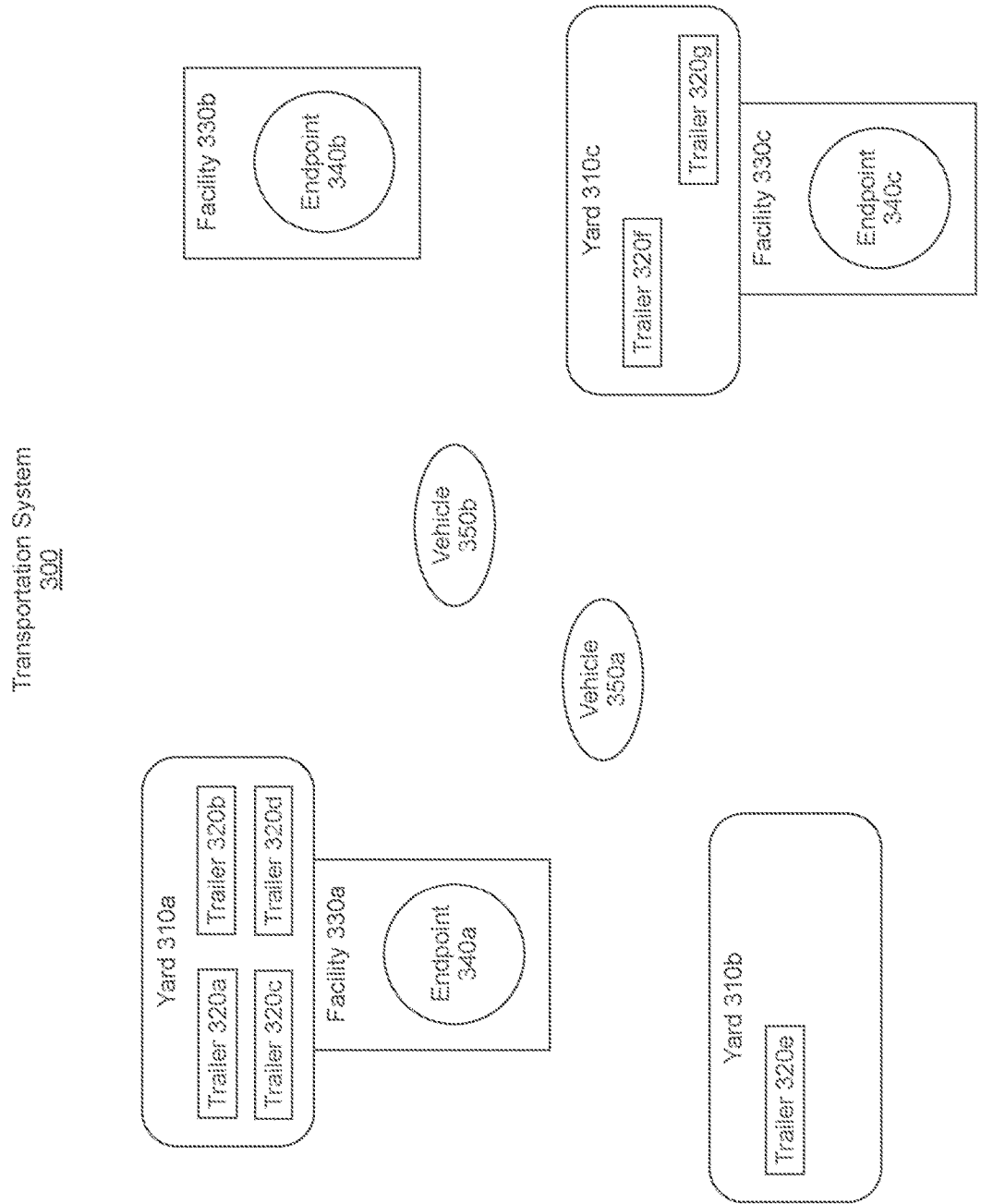
FIG. 3 illustrates a block diagram of a transportation system, according to an embodiment.

FIG. 3 illustrates a block diagram of a transportation system 300, according to an embodiment. The system 300 depicts some of the entities that can be included in a system for transporting items from an origin to a destination. The system 300 can include a plurality of yards 310a-310c (generally referred to as yards 310). The system 300 can include a plurality of trailers 320a-320g (generally referred to as trailers 320). The system 300 can include a plurality of facilities 330a-330c (generally referred to as facilities 330). The system 300 can include a plurality of endpoints 340a-340c (generally referred to as endpoints 340). The system 300 can include vehicles 350a and 350b (generally referred to as vehicles 350). It should be understood that the elements depicted in FIG. 3 are illustrative only. In practice, a system like the system 300 could include more or fewer of any of the elements shown in FIG. 3.

Each yard 310 can be an area suitable for storing other assets. For example, the yards 310 can be configured to store trailers 320 that are not currently in use. Trailers 320 that are located in a yard 310 can be considered available for use in fulfilling on-demand shipment requests. A trailer 320 can be any type of unpowered vehicle suitable for storing or carrying one or more items of a shipment. A trailer 320 can be a semi-trailer or a full trailer. A trailer 320 can include a cargo portion that may be either partially or fully enclosed. A trailer 320 can include wheels and a mechanism for attachment to a powered vehicle (such as the vehicles 350) to allow the trailer 320 to be towed or otherwise moved by the powered vehicle.

The facilities 330 can be locations that are configured to send, receive, or process shipments. For example, a facility 330 can be or can include a warehouse or other enclosed structure for storing goods. A facility 330 can also include one or more docks or loading bays for receiving the trailers 320. A trailer 320 can be positioned in a dock at a facility 330 to be loaded with cargo from the facility 330, or to have cargo unloaded and brought into the facility 330. Some facilities 330 may include or may be positioned near a yard 310. For example, the facility 330a is positioned adjacent to the yard 310a. This positioning can be convenient for a facility 330 that owns and maintains its own yard assets. Other facilities 330 may not have their own respective yards 310, such as the facility 330b. Likewise, there may be yards 310 that are not associated with any specific facility, such as the yard 310b.

Each of the endpoints 340 can represent a respective shipper or receiver. The endpoints 340 are generally positioned at or within a corresponding facility 330. Thus, the endpoint 340a corresponds to the facility 330a, the endpoint 340b corresponds to the facility 330b, and the endpoint 340c corresponds to the facility 330c. The endpoints 340 are represented separately from the facilities 330 in FIG. 3 to indicate that they may serve different functions and may collect and use different data. For example, a facility 330 may represent a location and physical infrastructure (e.g., loading docks, warehouses, etc.) while an endpoint 340 may represent other administrative elements (e.g., workers who load or unload trailers at the loading docks, etc.).

The vehicles 350 can be any type of vehicle suitable for moving a trailer 320. For example, the vehicles 350 can be local trucks (which may also be referred to as "spotter trucks" in this disclosure) or long-haul trucks. Each vehicle 350 can include an engine or other power source. In some embodiments, a vehicle 350 may be operated by a driver. In some embodiments, a vehicle 350 may be an autonomous vehicle or a robotic vehicle configured to move without a human operator. A vehicle 350 can be configured to pick up a trailer 320 at a yard 310 or a facility 330 and move the trailer 320 to another yard 310 or facility 330.

Figure 4:
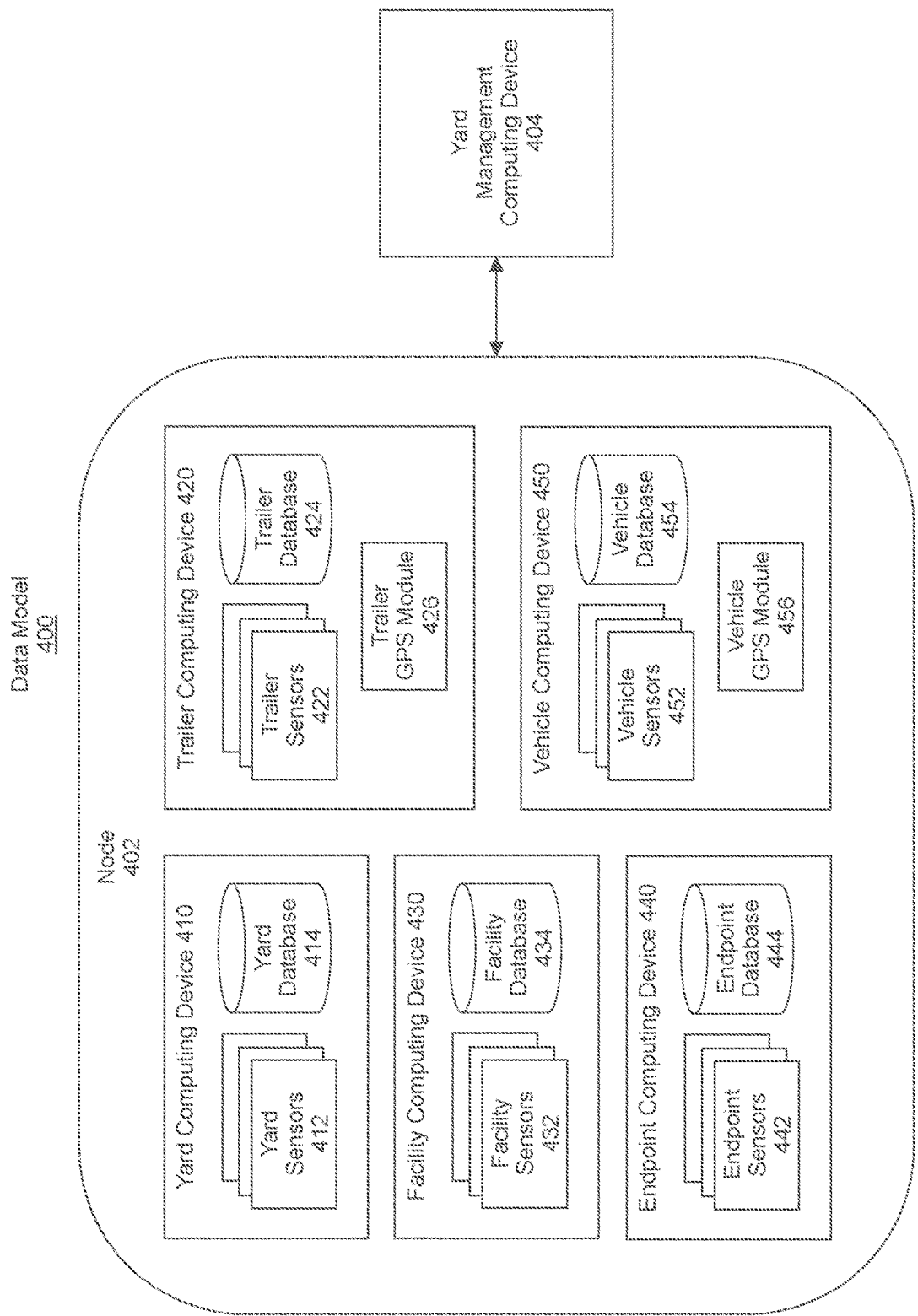
FIG. 4 illustrates a block diagram of a data model for automated allocation of shared resources in a transportation network, according to an embodiment.

FIG. 4 illustrates a block diagram of a data model 400 for automated allocation of shared resources in a transportation network, according to an embodiment. The data model 400 can include respective computing devices for each entity of a transportation system, such as the system 300 described above in connection with FIG. 3. For example, the data model 400 can include a yard computing device 410. The yard computing device 410 can be or can include a device similar to the user device 104 of FIG. 1. The yard computing device 410 can be associated with a respective yard, such as any of the yards 310 of FIG. 3.

The yard computing device 410 can include one or more yard sensors 412. The yard computing device 410 can include a yard database 414. At least some of the elements of the yard database 414 can be located within its respective yard. For example, the yard sensors 412 can include proximity sensors configured to monitor available spaces in the yard to determine whether the spaces are occupied by trailers. Such sensors can be implemented, for example, using radio frequency identification (RFID) tags or near-field communication (NFC) tags. The yard database 414 can store information related to the yard. For example, the yard database 414 can store an address of the yard, geographical coordinates of the yard, map data for the yard, or image data for the yard. Map data may include an outline of the yard and information on the location of other features in the yard, such as spaces or docks for trailers. The yard database 414 may also store information relating to occupancy of the yard by trailers. For example, the yard database 414 can store information relating to how many trailers are in the yard, how much available space is remaining in the yard, and identification information for each trailer currently in the yard. Such information can be monitored, for example, by the yard computing device 410 so that the information can be updated continuously or periodically in the yard database 414.

The data model 400 can include a trailer computing device 420. The trailer computing device 420 can be or can include a device similar to the user device 104 of FIG. 1. The trailer computing device 420 can be associated with a respective trailer, such as any of the trailers 320 of FIG. 3. The trailer computing device 420 can include one or more trailer sensors 422. The trailer computing device 420 can include a trailer database 424. The trailer computing device 420 can include a trailer GPS module 426.

At least some of the respective elements of the trailer computing device 420 can be located on or inside its respective trailer. For example, one or more of the trailer sensors 422 can be positioned inside a cargo space of the trailer. In some embodiments, the trailer sensors 422 can include environmental sensors configured to monitor one or more environmental conditions inside the trailer (e.g., temperature, humidity, etc.). The trailer sensors 422 can also include proximity sensors, such as RFID or NFC tags. Such proximity sensors can be configured to interact with counterpart sensors, such as the yard sensors 412 described above, to allow the location of the trailer with respect to a particular dock or yard space to be monitored.

The trailer GPS module 426 can be configured to monitor a location of the trailer to allow the trailer to be located remotely. The trailer database 424 can store information about the trailer. In some embodiments, the trailer database 424 can store information uniquely identifying the trailer from among a group of other trailers, such as a serial number. The trailer database 424 can store a current location of the trailer. The trailer database 424 can store location history for the trailer.

The data model 400 can include a facility computing device 430. The facility computing device 430 can be or can include a device similar to the user device 104 of FIG. 1. The facility computing device 430 can be associated with a respective facility, such as any of the facilities 330 of FIG. 3. The facility computing device 430 can include one or more facility sensors 432. The facility computing device 430 can also include a facility database 434.

At least some of the respective elements of the facility computing device 430 can be located on or inside its respective facility. For example, the facility sensors 432 can include proximity sensors configured to monitor available loading docks at the facility to determine whether the docks are occupied by trailers. Such sensors can be implemented, for example, using RFID tags or near-field communication NFC tags. The facility database 434 can store information related to the facility. For example, the facility database 434 can store an address of the facility, geographical coordinates of the facility, map data for the facility, or image data for the facility. Map data may include an outline of the facility and information on the location of other features in the facility, such as loading docks for trailers. Such information can be monitored, for example, by the facility computing device 430 so that the information can be updated continuously or periodically in the facility database 434. The facility database 434 can also store geofence data. Geofence data can include information identifying a boundary surrounding the facility. The geofence can be used to determine when a vehicle or trailer is approaching or leaving the facility. In some embodiments, the facility database 434 may store information for more than one geofence. For example, a first geofence may surround the facility at a first distance, while a second geofence may surround the facility at a second distance that is greater than or less than the first distance. Thus, the second geofence may be inside or outside of the first geofence.

The data model 400 can include an endpoint computing device 440. The endpoint computing device 440 can be or can include a device similar to the user device 104 of FIG. 1. The endpoint computing device 440 can be associated with a respective endpoint, such as any of the endpoints 340 of FIG. 3. The endpoint computing device 440 can include one or more facility endpoint sensors 442. The endpoint computing device 440 can also include an endpoint database 444.

In some implementations, the endpoint computing device 440 can be a handheld device such as a mobile phone that is operated by an employee or other human operator at the endpoint. The facility computing device 430 may have a display screen to provide graphical user interface outputs to the operator, as well as input mechanisms such as a touchscreen interface to receive inputs from the operator. The endpoint sensors 442 can include, for example, proximity sensors to be used to determine when goods, a trailer, or a vehicle are positioned near the endpoint computing device 440. The endpoint sensors 442 may also include a barcode scanner to scan items for a shipment. The endpoint database 444 can store any of this information to be recorded for later use. The endpoint database 444 can also store account information for the shipper. An operator can use the endpoint computing device 440 to request a new shipment, accept a shipment, monitor a shipment, etc.

The data model 400 also includes a vehicle computing device 450. The vehicle computing device 450 can be or can include a device similar to the user device 104 of FIG. 1. The vehicle computing device 450 can include vehicle sensors 452. The vehicle computing device 450 can include a vehicle database 454. The vehicle computing device 450 can include a vehicle GPS module 456.

At least some of the respective elements of the vehicle computing device 450 can be located on or inside its respective vehicle. For example, one or more of the vehicle sensors 452 can be positioned inside a cab or on a trailer hitch of the vehicle. In some embodiments, the vehicle sensors 452 can include proximity sensors, such as RFID or NFC tags. Such proximity sensors can be configured to interact with counterpart sensors, such as the trailer sensors 422, the facility sensors 432, the endpoint sensors 442, or the yard sensors 412 described above, to allow the location of the vehicle with respect to a particular dock or trailer to be monitored.

The vehicle GPS module 456 can be configured to monitor a location of the vehicle to allow the vehicle to be located remotely. In some embodiments, the vehicle GPS module 456 can be used to display navigation directions to a driver of the vehicle. In some embodiments, the vehicle GPS module 456 can be configured to integrate with a control system of the vehicle (e.g., an engine and steering controls) to allow the vehicle to navigate autonomously. The vehicle database 454 can store information about the vehicle. In some embodiments, the vehicle database 454 can store information uniquely identifying the vehicle from among a group of other vehicles, such as a serial number. The vehicle database 454 can store a current location of the vehicle. The vehicle database 454 can store location history for the vehicle.

The yard computing device 410, the trailer computing device 420, the facility computing device 430, the endpoint computing device 440, and the vehicle computing device 450 together can form a node 402. It should be understood that the elements shown in the node 402 are illustrative only. In practice, a node such as the node 402 may include any number of yard computing devices 410, trailer computing devices 420, facility computing devices 430, endpoint computing devices 440, and vehicle computing devices 450. In some embodiments, the elements that form the node 402 may be selected for inclusion in the node 402 based on being located in the same geographic region. In some embodiments, an optimization function can be used to determine which elements are included in the node 402, and which elements should instead be included in another node.

The node 402 is communicatively coupled with a yard management computing device 404. The elements that form the node 402 may each communicate with one another, and each may also communicate independently with the yard management computing device 404. The yard management computing device 404 can be or can include a device similar to the user device 104 of FIG. 1. The yard management computing device 404 can receive inputs from the elements of the node 402 to help allocate resources (e.g., trailers, vehicles, etc.) to process shipments in an automated fashion.

Figure 5:
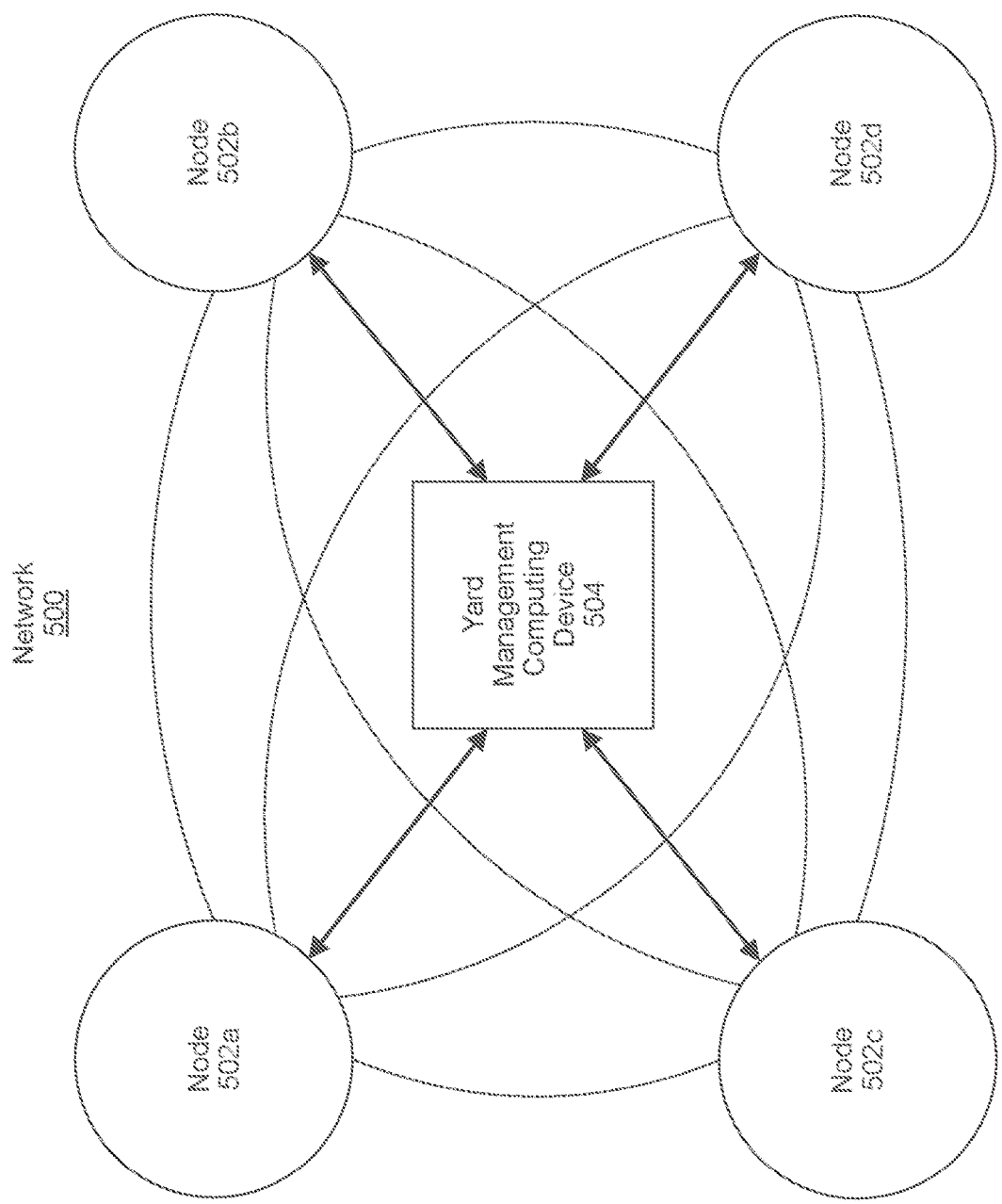
FIG. 5 illustrates a block diagram of a transportation network, according to an embodiment.

FIG. 5 illustrates a block diagram of a transportation network 500, according to an embodiment. The network 500 can include a plurality of nodes 502a-502d (generally referred to as nodes 502). The network 500 can include a yard management computing device 504. The yard management computing device 504 can be communicatively coupled with each of the nodes 502, as represented by the solid arrows in FIG. 5. The nodes 502 are linked by broken lines in FIG. 5 that represent shipping lanes (e.g., roads, highways, etc.) between the nodes 502.

In some embodiments, each node 502 can include any of the elements shown inside the node 402 of FIG. 4, such as the yard computing devices 410, the trailer computing devices 420, the facility computing devices 430, the endpoint computing device 440, and the vehicle computing devices 450. While not depicted in FIG. 5, there may be other assets and corresponding computing devices in the network 500. For example, vehicles (e.g., long-haul trucks) and corresponding vehicle computing devices can travel between the nodes 502 along the shipping lines. In addition, there may be more or fewer nodes 502 than are depicted in FIG. 5, and each node 502 may be communicatively coupled with the yard management computing device 504.

The yard management computing device 504 can receive inputs from all of the elements in each node 502. Based on those inputs, the yard management computing device 504 can allocate shared assets such as trailers and vehicles to complete shipments within a node 502 and between the nodes 502. Details of the operation of the yard management computing device 504 to manage shipments in are described further below.

Figure 6:
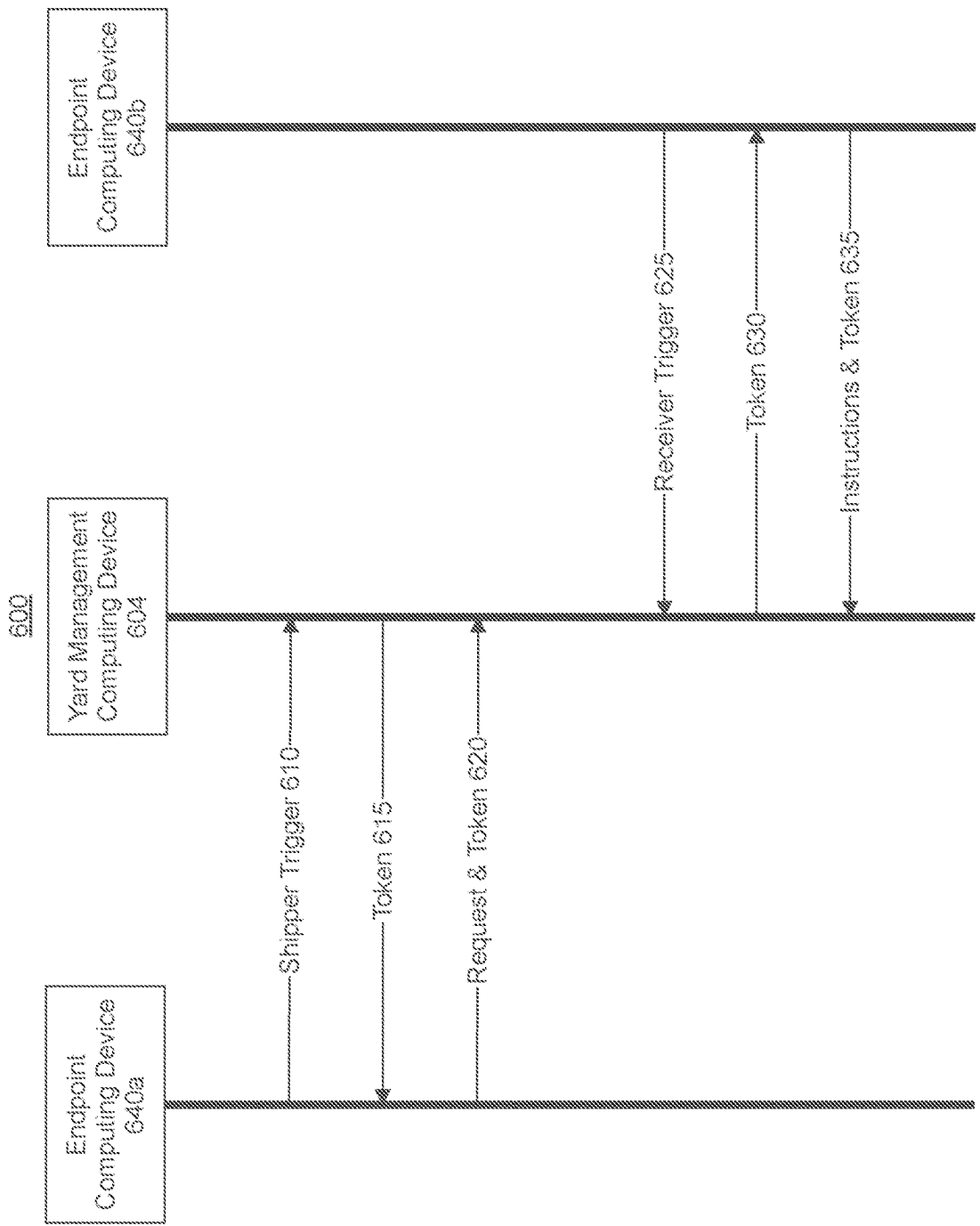
FIG. 6 illustrates a sequence diagram for automated allocation of shared resources in a transportation network, according to an embodiment.

FIG. 6 illustrates a sequence diagram 600 for automated allocation of shared resources in a transportation network, according to an embodiment. Arrows in the sequence diagram 600 represent the direction and order of data flow between the endpoint computing device 640a, the endpoint computing device 640b, and the yard management computing device 604. In this example, the endpoint computing device 640a can represent a computing device used by a shipper of a shipment and may be similar to the endpoint computing device 440 of FIG. 4. The endpoint computing device 640b can represent a computing device used by a receiver of the shipment. While the arrows in the sequence diagram 600 indicate that data flows directly between the endpoint computing device 640a, the endpoint computing device 640b, and the yard management computing device 604, it should be understood that in some embodiments, data may pass through one or more intermediary devices via a communication network.

In an operation 610, the yard management computing device 604 receives from the endpoint computing device 640a a trigger indicating that a shipment is requested. In some embodiments, the yard management computing device 604 can detect the trigger by interfacing with a shipment scheduling system and determining that the endpoint computing device 640a was used to schedule a new shipment. The yard management computing device 604 can then generate an authorization token for the shipment. The authorization token can be a software object known to the yard management computing device 604 that uniquely identifies the shipper and the requested shipment.

In an operation 615, the yard management computing device 604 can transmit the authorization token to the endpoint computing device 640a. After receiving the authorization token, the endpoint computing device 640a can build a request. The request can specify details of the shipment, such as requirements for a trailer type or size, the shipper's facility location, a specific loading dock where the trailer for the shipment should be brought, etc. At an operation 620, the endpoint computing device 640a can transmit the request and the authorization token to yard management computing device 604. Including the authorization token in the data sent to the yard management computing device 604 at operation 620 can allow the yard management computing device 604 to validate the request. For example, detecting the presence of the authorization token in the data received at operation 620 can allow the yard management computing device 604 to determine that the request is not unauthorized or fraudulent.

After validating the request, the yard management computing device 604 can process the request. In some embodiments, the yard management computing device 604 can process the request by identifying a trailer and a vehicle to retrieve the trailer from its current location. The selected vehicle can then bring the selected trailer to a particular dock at the shipping facility to be loaded. There may be more than one trailer and/or more than one vehicle available. The yard management computing device 604 can select a specific trailer and a specific vehicle using an optimization algorithm. An optimization function can use inputs such as an occupancy status and location of each trailer and vehicle, the location of the shipping facility, and any special requirements that were included in the request, to identify an appropriate trailer and vehicle. The yard management computing device 604 can instruct the selected vehicle (or a driver of the selected vehicle) to drive the vehicle to the shipping facility by sending information to the corresponding vehicle computing device.

In some embodiments, the operations 615 and 620 may be repeated multiple times, to allow the shipper to make any additional requests that may be necessary to complete the shipment. When the shipment is loaded onto the trailer and a vehicle is found to take the trailer to its destination, the yard management computing device 604 can again regain control of the authorization token.

In an operation 625, the yard management computing device 604 can detect a second trigger associated with delivery of the shipment. In some embodiments, the second trigger can be detected when the trailer carrying the shipment or the vehicle towing the trailer crosses a first geofence surrounding the destination facility. The first geofence can be spaced away from the destination facility by a first threshold distance.

In an operation 630, the yard management computing device 604 can transmit the authorization token to the endpoint computing device 640b at the destination facility. In some embodiments, the authorization token can be the same authorization token that was exchanged with the endpoint computing device 640a. In some other embodiments, a new authorization token can be created. The endpoint computing device 640b can then generate instructions for the shipment, which are sent to the yard management computing device 604 along with the authorization token in an operation 635. The instructions can indicate an address of the destination facility, a specific dock at which the shipment should be unloaded, or any other instructions regarding delivery of the shipment. The yard management computing device 604 can relay the instructions to the vehicle computing device of the vehicle towing the trailer with the shipment.

In some embodiments, the operations 630 and 635 may be repeated multiple times, to allow the receiver to make any additional requests that may be necessary to complete the delivery. When the shipment is unloaded from the trailer at the destination facility, the yard management computing device 604 can again regain control of the authorization token and the process is complete.

Figure 7:
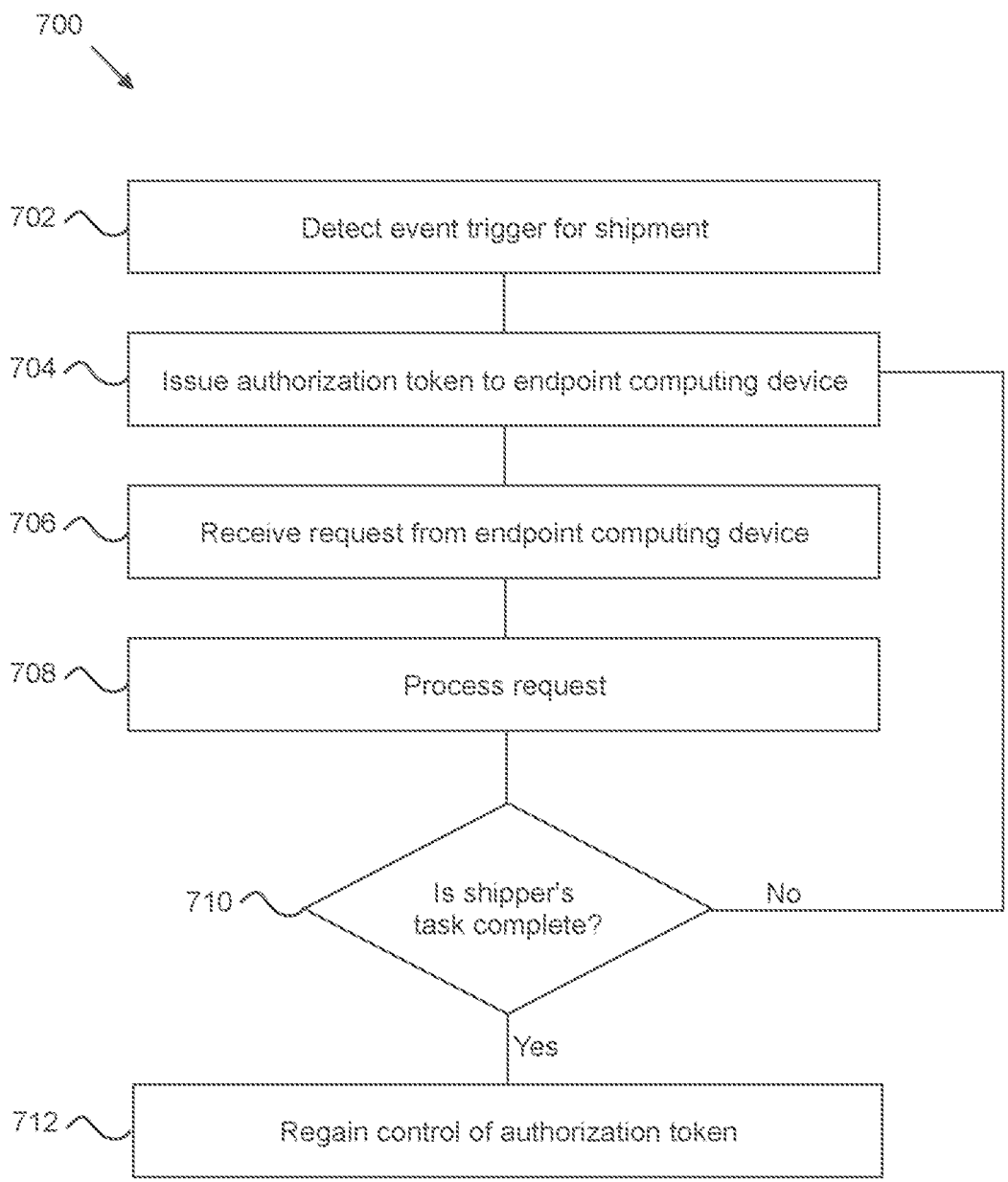
FIG. 7 illustrates a method of automating a shipment of an item in a transportation network, according to an embodiment.

FIG. 7 illustrates a method 700 of automating a shipment of an item in a transportation network, according to an embodiment. In some embodiments, the method 700 can be performed by a yard management computing device such as the yard management computing device 404 of FIG. 4, the yard management computing device 504 of FIG. 5, or the yard management computing device 604 of FIG. 6. The method 700 can include detecting an event trigger (block 702). In some embodiments, the event trigger can be any information indicating that a shipment of an item has been scheduled by a shipper. For example, the event trigger can be detected by interfacing with a shipment scheduling system to determine that the shipper has scheduled a new shipment. In some other embodiments, the shipper may contact the yard management computing device directly (e.g., via an endpoint computing device) to indicate that the shipment has been scheduled, and that contact can be interpreted by the yard management computing device as the event trigger.

The method 700 can include issuing an authorization token to and endpoint computing device (block 704). The yard management computing device can create the authorization token to include information uniquely identifying the shipment from among a group of shipments. The authorization token can also include an identification of the shipper that requested the shipment. The yard management computing device can transmit the authorization token to the endpoint computing device associated with the shipper.

The method 700 can include receiving a request for the shipment from the endpoint computing device (block 706). The request can include the authorization token. The request can also include information identifying an item to be included in the shipment. The request can also include location information for an origin facility where the item is to be retrieved. In some embodiments, the origin facility can be associated with a facility computing device.

The method 700 can include processing the request (block 708). In some embodiments, before processing the request, the yard management computing device can validate the request by determining that the authorization token is included in the request. The yard management computing device can identify a trailer and a vehicle to be used for completing the shipment. The trailer can be associated with a trailer computing device and the vehicle can be associated with a vehicle computing device. The yard management computing device can select the vehicle and the trailer from among a group of vehicles and a group of trailers, for example by using an optimization algorithm to minimize or reduce a total distance to be traveled or a total amount of travel time to move the vehicle and the trailer to the shipment facility. The yard management computing device can update the authorization token to include information identifying the trailer and the vehicle to be used for completing the shipment. The yard management computing device can transmit information to the vehicle computing device including an identification of the trailer, an identification of a yard where the trailer is located, and instructions for navigating from the yard to the origin facility.

The method 700 can include determining whether the shipper's task is complete (block 710). For example, the yard management computing device can verify that the item has been loaded onto the trailer based on inputs received from the facility computing device, the trailer computing device, the vehicle computing device, and the endpoint computing device. If the shipper's task is not complete, the method can return to block 704.

The method 700 can include regaining control of the authorization token (block 712). At this stage, the shipper's tasks are complete and the yard management computing device can update the authorization token to indicate that loading of the item onto the trailer for the shipment is complete. The trailer containing the item to be shipped can then begin moving to the destination facility.

Figure 8:
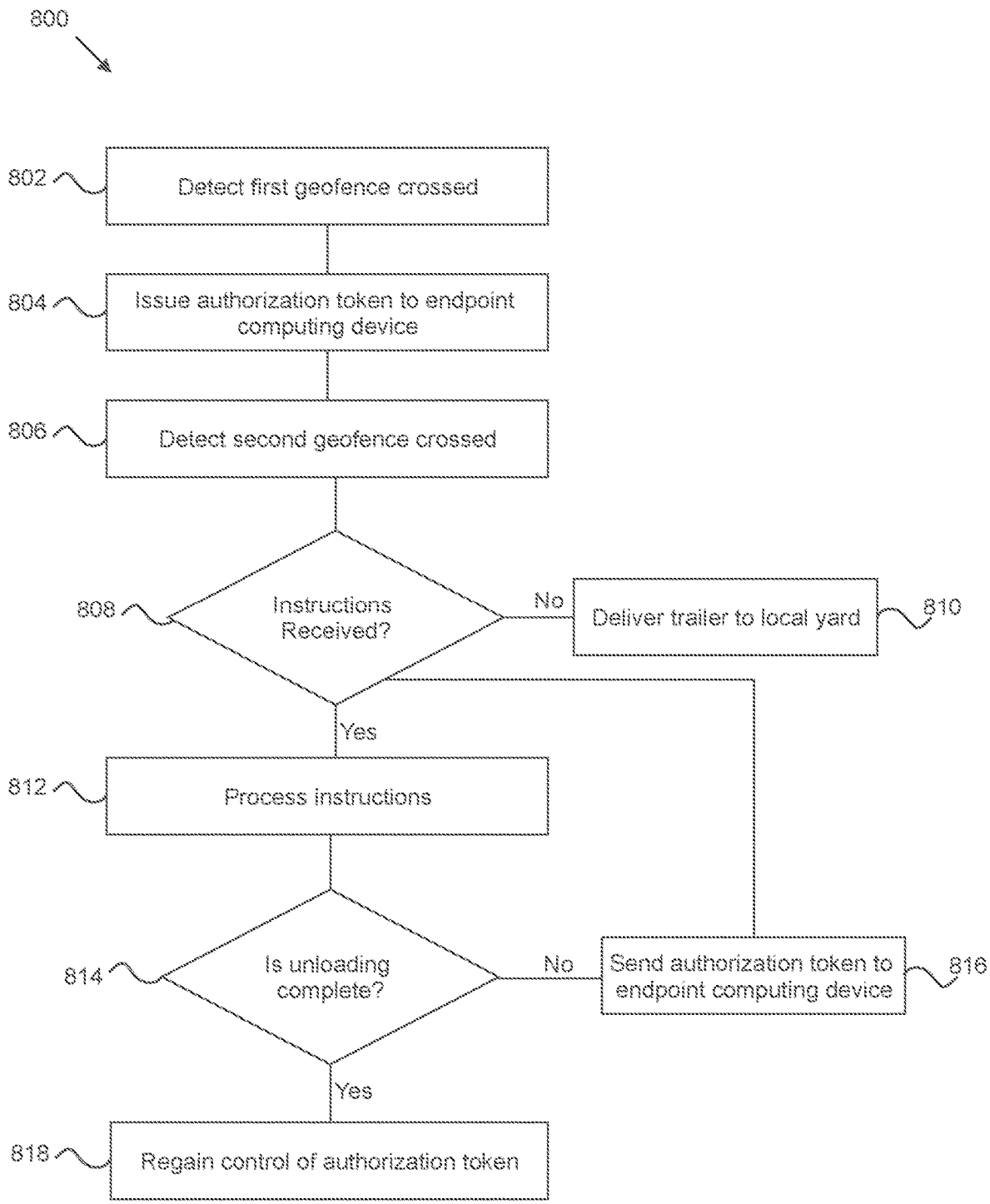
FIG. 8 illustrates a method of automating a delivery of an item in a transportation network, according to an embodiment.

FIG. 8 illustrates a method 800 of automating a delivery of an item in a transportation network, according to an embodiment. In some embodiments, the method 700 can be performed by a yard management computing device such as the yard management computing device 404 of FIG. 4, the yard management computing device 504 of FIG. 5, or the yard management computing device 604 of FIG. 6. In some embodiments, the method 800 can be performed following completion of the method 700 shown in FIG. 7.

The method 800 can include detecting that a trailer computing device has crossed a first geofence around a destination facility (block 802). The trailer computing device can be associated with a trailer carrying a shipment to be delivered to the destination facility. The yard management computing device can determine that the trailer computing device has crossed the first geofence by monitoring a location of the trailer computing device over time. In some embodiments, the trailer computing device can monitor its own location over time, and can notify the yard management computing device when it crosses the first geofence. In some implementations, the yard management computing device may instead determine that a vehicle computing device associated with the shipment has crossed the first geofence, rather the trailer computing device. For example, the vehicle computing device can be associated with a vehicle that is towing the trailer to the destination facility.

The method 800 can include issuing an authorization token to and endpoint computing device associated with the shipment (block 804). The authorization token can be sent along with a request for instructions for processing the delivery of the shipment. The authorization token can include information uniquely identifying the shipment from among a plurality of shipments.

The method can include detecting that the trailer computing device has crossed a second geofence around the destination facility (block 806). In some embodiments, the second geofence can be nearer to the destination facility than the first geofence. Detecting that the trailer computing device has crossed the second geofence can be done in a manner similar to that described above in connection with detecting that the trailer computing device has crossed the first geofence (block 802).

The method 800 can include determining whether instructions have been received from the endpoint computing device when the trailer computing device crossed the second geofence (block 808). Without the instructions, it may not be possible to deliver the shipment to the destination facility. Thus, the method 800 can include delivering the trailer to a local yard (block 810) where the trailer can be stored temporarily until instructions are received for bringing the trailer to the destination facility. To accomplish this, the yard management computing device can transmit to a vehicle computing device associated with a vehicle that is towing the trailer, navigation directions to a local yard and instructions to store the trailer in the yard temporarily.

If the instructions have been received when the trailer computing device crossed the second geofence, the method 800 can include processing the instructions (block 812). In some embodiments the yard management computing device can validate the instructions by determining that the authorization token is included with the instructions. When the instructions are validated, the yard management computing device can transmit, to the vehicle computing device, directions to navigate according to the instructions received from the endpoint computing device so that the trailer can be brought to the appropriate delivery point at the destination facility.

The method 800 can include determining whether unloading of the delivery is complete (block 814). The yard management computing device can verify the item or items have been unloaded from the trailer at the destination facility, for example, based on inputs received from the facility computing device, the trailer computing device, the vehicle computing device, and the endpoint computing device. If unloading is not complete, the method 800 can include sending the authorization token back to the endpoint computing device (block 816), and then awaiting further instructions from the endpoint computing device by returning to block 808. If unloading is complete, the method 800 can include regaining control of the authorization token (block 818). The yard management computing device can then update the token to indicate that unloading of the item from the trailer is complete.

At least one aspect of this disclosure is directed to a system. The system can include a facility computing device configured to store data corresponding to a location of a transportation facility. The system can include a vehicle computing device associated with a vehicle and configured to provide navigation directions for the vehicle. The system can include a yard database storing information corresponding to a location of a yard for staging trailers. The system can include a trailer computing device associated with a trailer and configured to track a location of the trailer. The system can include a first endpoint computing device. The system can include a second endpoint computing device. The system can include a yard management computing device communicatively coupled with the facility computing device, the vehicle computing device, the yard database, the trailer computing device, the first endpoint computing device, and the second endpoint computing device. The yard management computing device can be configured to issue an authorization token to the first endpoint computing device. The authorization token can include an identifier associated with the first endpoint computing device. The yard management computing device can be configured to receive a request from the first endpoint computing device for a shipment of an item from the transportation facility to a receiver. The request can include the authorization token and an identifier of the receiver for the shipment. The receiver can be associated with the second endpoint computing device. The yard management computing device can be configured to transmit, to the vehicle computing device, an identification of the trailer associated with the trailer computing device, an identification of the yard where the trailer is located, and instructions for navigating from the yard to the transportation facility. The yard management computing device can be configured to determine that the item has been loaded onto the trailer based on inputs received from the facility computing device, the trailer computing device, the vehicle computing device, and the first endpoint computing device. The yard management computing device can be configured to update the authorization token to indicate that loading of the item onto the trailer for the shipment is complete. The yard management computing device can be configured to determine that the trailer has crossed a geofence associated with the second endpoint computing device. The yard management computing device can be configured to transmit, to the second endpoint computing device, a request for instructions including the authorization token.

In some embodiments, the facility computing device can further include at least one sensor positioned at a dock within the transportation facility and configured to determine whether the dock is occupied by the trailer. In some embodiments, the sensor can be configured to communicate with the trailer computing device to determine an identifier of the trailer when the dock is occupied by the trailer.

In some embodiments, the vehicle computing device can further include a global positioning system (GPS) module configured to determine a location of the vehicle and to provide the navigation directions for the vehicle. In some embodiments, the vehicle computing device can further include a graphical user interface for displaying the navigation directions to a driver of the vehicle. In some embodiments, the vehicle computing device can be configured to transmit the navigation directions to a control system of the vehicle to cause the vehicle to drive autonomously according to the navigation directions.

In some embodiments, the trailer computing device can further include a GPS module configured to determine a location of the trailer. In some embodiments, the trailer computing device can further include at least one of a radio frequency identification (RFID) module or a near-field communication (NFC) module configured to communicate with the facility computing device. In some embodiments, the trailer computing device can further include at least one of a weight sensor configured to determine a weight of a load on the trailer and an environmental sensor configured to determine an environmental condition inside the trailer.

In some embodiments, the vehicle can be a first vehicle, and the yard management computing device can be further configured to select a second vehicle, different from the first vehicle, for transporting the trailer from the transportation facility to the receiver. In some embodiments, the yard management computing device can be further configured to transmit, to a second vehicle computing device associated with the second vehicle, a first set of instructions for navigating to the transportation facility, responsive to determining that the item has been loaded onto the trailer. The yard management computing device can also be configured to transmit, to the second vehicle computing device, a second set of instructions for navigating from the transportation facility to the receiver. In some embodiments, the first vehicle can be a local truck and the second vehicle can be a long-haul truck.

Another aspect of this disclosure is directed to a method. The method can include detecting, by a yard management computing device, an event trigger indicating that a shipment of an item has been scheduled by a shipper. The method can include creating, by the yard management computing device, an authorization token comprising information uniquely identifying the shipment from among a plurality of shipments. The method can include transmitting, by the yard management computing device, the authorization token to an endpoint computing device associated with the shipper. The method can include receiving, by the yard management computing device, a request for the shipment from the endpoint computing device. The request can include the authorization token, information identifying an item to be included in the shipment, and location information for an origin facility where the item is to be retrieved, wherein the origin facility is associated with a facility computing device. The method can include validating, by the yard management computing device, the request by determining that the authorization token is included in the request. The method can include identifying, by the yard management computing device, a trailer and a vehicle to be used for completing the shipment. The trailer can be associated with a trailer computing device and the vehicle can be associated with a vehicle computing device. The method can include updating, by the yard management computing device, the authorization token to include information identifying the trailer and the vehicle to be used for completing the shipment. The method can include transmitting, by the yard management computing device to the vehicle computing device, an identification of the trailer, an identification of a yard where the trailer is located, and instructions for navigating from the yard to the origin facility. The method can include verifying, by the yard management computing device, that the item has been loaded onto the trailer based on inputs received from the facility computing device, the trailer computing device, the vehicle computing device, and the endpoint computing device. The method can include updating, by the yard management computing device, the authorization token to indicate that loading of the item onto the trailer for the shipment is complete.

In some embodiments, the location information for the origin facility can include map data specifying a location of at least one loading dock at origin facility. In some embodiments, the yard management computing device can be further configured to select the vehicle from among a plurality of vehicles and to select the trailer from among a plurality of trailers. In some embodiments, the yard management computing device can be further configured to select the vehicle and the trailer based on an optimization algorithm.

In some embodiments, the method can include, prior to verifying that the item has been loaded onto the trailer, transmitting, by the yard management computing device, the authorization token to the endpoint computing device. The method can also include receiving, by the yard management computing device from the endpoint computing device, and indication that the loading of the item onto the trailer is complete.

Another aspect of this disclosure is directed to a method. The method can include detecting, by a yard management computing device, that a trailer computing device associated with a trailer carrying a shipment has crossed a first geofence defined around a destination facility. The method can include transmitting, by the yard management computing device to an endpoint computing device associated with a recipient of the shipment, a request for instructions including an authorization token comprising information uniquely identifying the shipment from among a plurality of shipments. The method can include detecting, by the yard management computing device, that the trailer computing device associated with the trailer carrying the shipment has crossed a second geofence defined around the destination facility. In some embodiments, the second geofence can be nearer to the destination facility than the first geofence. The method can include determining, by the yard management computing device, whether the instructions have been received from the endpoint computing device when the trailer computing device crossed the second geofence. The method can include, responsive to determining that the instructions have not been received from the endpoint computing device when the trailer computing device crossed the second geofence, transmitting, to a vehicle computing device associated with a vehicle that is towing the trailer, navigation directions to a yard and instructions to store the trailer in the yard temporarily.

In some embodiments, the method can further include, responsive to determining that the instructions have been received from the endpoint computing device when the trailer computing device crossed the second geofence, validating, by the yard management computing device, the instructions by determining that the authorization token is included with the instructions. The method can also include transmitting, to the vehicle computing device, directions to navigate according to the instructions received from the endpoint computing device.

In some embodiments, the method can include verifying, by the yard management computing device, that the item has been unloaded from the trailer at the destination facility based on inputs received from the facility computing device, the trailer computing device, the vehicle computing device, and the endpoint computing device. The method can also include updating, by the yard management computing device, the token to indicate that unloading of the item from the trailer is complete.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system, comprising:
a facility computing device configured to store data corresponding to a location of a transportation facility;
a vehicle computing device associated with a vehicle and configured to provide navigation directions for the vehicle;
a yard database storing information indicating a location of a yard for staging trailers;
a first endpoint computing device;
a second endpoint computing device; and
a trailer computing device:
associated with a trailer; and
configured to track a location of the trailer, wherein the trailer computing device comprises:
a first trailer sensor coupled to a cargo space of the trailer containing an item, wherein:
the first trailer sensor is positioned on the trailer and is configured to track a location of the trailer in relation to a geofence; and
the first trailer sensor is configured to:
retrieve a first data set indicating the location of the trailer in relation to a geofence, wherein the first data set comprises:
an indication of whether the first trailer sensor detected that the trailer crossed the geofence; and
transmit, via the trailer computing device, the first data set to at least one of a yard management computing device or the second endpoint computing device; and
the yard management computing device communicatively is coupled with the facility computing device, the vehicle computing device, the yard database, the trailer computing device, the first endpoint computing device, and the second endpoint computing device, wherein the yard management computing device is configured to:
issue an authorization token, along with a set of first instructions, to the first endpoint computing device, wherein the authorization token comprises an identifier associated with the first endpoint computing device;

receive a request from the first endpoint computing device for the shipment of the item from the transportation facility to a receiver, the request comprising the authorization token and an identifier of the receiver for the shipment, wherein:
the receiver is associated with the second endpoint computing device; and
validation of the request by determining that the authorization token is included in the request initiates the shipment of the item from the transportation facility;

transmit, to the vehicle computing device, an identification of the trailer associated with the trailer computing device, an identification of the yard where the trailer is located, and additional instructions for navigating from the yard to the transportation facility;

determine that the item has been loaded onto the trailer based on inputs received from the facility computing device, the trailer computing device, the vehicle computing device, and the first endpoint computing device;

update the authorization token to indicate that loading of the item onto the trailer for the shipment is complete;

determine that the trailer has crossed a geofence associated with the second endpoint computing device;

transmit, to the second endpoint computing device, a request for second instructions including the authorization token;

transmit, via the second endpoint computing device, to the yard management computing device, the second instructions including the authorization token; and transmit, to the vehicle computing device, the second instructions upon a successful verification that the second instructions received from the second endpoint device included the authorization token.

2. The system of claim 1, wherein the facility computing device further comprises at least one sensor positioned at a dock within the transportation facility and configured to determine whether the dock is occupied by the trailer.

3. The system of claim 2, wherein the at least one sensor is further configured to communicate with the trailer computing device to determine an identifier of the trailer when the dock is occupied by the trailer.

4. The system of claim 1, wherein the vehicle computing device further comprises a global positioning system (GPS) module configured to determine a location of the vehicle and to provide the navigation directions for the vehicle.

5. The system of claim 1, wherein the vehicle computing device is further configured to transmit the navigation directions to a control system of the vehicle to cause the vehicle to drive autonomously according to the navigation directions.

6. The system of claim 1, wherein the trailer computing device further comprises at least one of:
a global positioning system (GPS) module configured to determine the location of the trailer; a radio frequency identification (RFID) module configured to communicate with the facility computing device;
a near-field communication (NFC) module configured to communicate with the facility computing device;
a weight sensor configured to determine a weight of a load on the trailer; or an environmental sensor configured to determine an environmental condition inside the trailer.

7. The system of claim 1, wherein the vehicle is a first vehicle, and wherein the yard management computing device is further configured to select a second vehicle, different from the first vehicle, for transporting the trailer from the transportation facility to the receiver.

8. The system of claim 7, wherein the yard management computing device is further configured to:
transmit, to the second vehicle computing device associated with the second vehicle, a first set of instructions for navigating to the transportation facility, responsive to determining that the item has been loaded onto the trailer; and
transmit, to the second vehicle computing device, a second set of instructions for navigating from the transportation facility to the receiver.

9. The system of claim 7, wherein:
the first vehicle comprises a local truck; and
the second vehicle comprises a long-haul truck.

10. A method, comprising:
detecting, by a yard management computing device, an event trigger indicating that a shipment of an item has been scheduled by a shipper;
creating, by the yard management computing device, an authorization token comprising information uniquely identifying the shipment from among a plurality of shipments;
transmitting, by the yard management computing device, the authorization token to an endpoint computing device associated with the shipper;
receiving, by the yard management computing device, a request for the shipment from the endpoint computing device, wherein validation of the request by determining that the authorization token is included in the request initiates the shipment of the item from the transportation facility, the request comprising:
the authorization token, further comprising;
information identifying the item to be included in the shipment; and
location information for an origin facility where the item is to be retrieved, wherein the origin facility is associated with a facility computing device;
validating, by the yard management computing device, the request by determining that the authorization token is included in the request;
identifying, by the yard management computing device, a trailer and a vehicle to be used for completing the shipment, wherein the trailer is associated with a trailer computing device and the vehicle is associated with a vehicle computing device;
updating, by the yard management computing device, the authorization token to include information identifying the trailer and the vehicle to be used for completing the shipment;
transmitting, by the yard management computing device to the vehicle computing device, an identification of the trailer, an identification of a yard where the trailer is located, and instructions for navigating from the yard to the origin facility, wherein the instructions comprise information indicating:
a location of the origin facility; and
verifying, by the yard management computing device, that the item has been loaded onto the trailer based on inputs received from the facility computing device, the trailer computing device, the vehicle computing device, and the endpoint computing device;

updating, by the yard management computing device, the authorization token to indicate that loading of the item onto the trailer for the shipment is complete;

periodically retrieving, by a first trailer sensor of the trailer computing device, a first data set indicating a location of the trailer, wherein the first data set comprises:

a set of coordinates of a current location of the trailer; and a set of preconfigured coordinates defining a geofence, wherein:

a difference is computed by subtracting the set of preconfigured coordinates from the set of coordinates of the current location of the trailer;

transmitting, via the trailer computing device, the first data set to one of a yard management computing device or a second endpoint computing device associated with a receiver at a first periodic frequency;

periodically retrieving, by a second trailer sensor of the trailer computing device, a second data set indicating the location of the trailer in relation to the geofence, wherein the second data set comprises:

an indication of whether the second trailer sensor detected the trailer crosses the geofence; and transmitting, via the trailer computing device, the second data set to a yard management computing device or the second endpoint computing device at a second periodic frequency.

11. The method of claim 10, wherein the location information for the origin facility further comprises map data specifying a location of at least one loading dock at the origin facility.

12. The method of claim 11, further comprising determining, by the yard management computing device, that the loading dock is occupied by the trailer.

13. The method of claim 10, further comprising applying, by the yard management computing device, an optimization algorithm to select the vehicle from among a plurality of vehicles or to select the trailer from among a plurality of trailers.

14. The method of claim 10, further comprising:

prior to verifying that the item has been loaded onto the trailer:

transmitting, by the yard management computing device, the authorization token to the endpoint computing device; and receiving, by the yard management computing device from the endpoint computing device, an indication that the loading of the item onto the trailer is complete.

* * * * *